US008761913B2

(12) United States Patent
Mazurik

(10) Patent No.: US 8,761,913 B2
(45) Date of Patent: *Jun. 24, 2014

(54) ENABLING COMMUNITY TOURNAMENTS

(76) Inventor: Laurel Anne Mazurik, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/482,501

(22) Filed: May 29, 2012

(65) Prior Publication Data

US 2012/0296707 A1 Nov. 22, 2012

Related U.S. Application Data

(62) Division of application No. 12/604,067, filed on Oct. 22, 2009, now Pat. No. 8,200,348.

(60) Provisional application No. 61/193,041, filed on Oct. 23, 2008.

(51) Int. Cl.
*G06F 19/00* (2011.01)

(52) U.S. Cl.
USPC .......... 700/91

(58) Field of Classification Search
USPC .......... 700/91–93; 463/42
See application file for complete search history.

(56) References Cited

U.S. PATENT DOCUMENTS 5,855,516 A 1/1999 Eiba
7,354,345 B2 * 4/2008 Bortnik et al. .......... 463/42
7,362,862 B2 4/2008 Schneier et al.
7,682,251 B2 * 3/2010 Bortnik et al. .......... 463/42
8,348,737 B2 * 1/2013 Page .......... 463/10
2002/0165843 A1 11/2002 Takahashi
2003/0189592 A1 10/2003 Boresjo
2005/0020352 A1 1/2005 Chilton et al.
2005/0043088 A1 2/2005 Nguyen et al.
2005/0043089 A1 2/2005 Nguyen et al.
2005/0071024 A1 3/2005 Henshaw
2005/0278041 A1 * 12/2005 Bortnik et al. .......... 700/91
2007/0162547 A1 7/2007 Ross
2008/0059891 A1 3/2008 Herzog
2008/0207332 A1 * 8/2008 Bortnik et al. .......... 463/42

FOREIGN PATENT DOCUMENTS

WO 0238228 5/2002

* cited by examiner

*Primary Examiner* — Ronald Laneau
(74) *Attorney, Agent, or Firm* — Mannava & Kang, P.C.

(57) ABSTRACT

In an example, generating and enabling a tournament includes a) selecting at least one pair of proposals from the accessed plurality of proposals for consideration, each selected pair of proposals being assigned to at most one match per tier; b) scheduling the at least one match; c) accessing a plurality of registered voters; d) assigning the plurality of registered voters to one match per tier; e) receiving information from the assigned registered voters; f) determining a winner and a loser of each match based on information provided by the registered voters of the respective matches; g) removing the loser of each match from consideration in generating matches in subsequent tiers of the tournament; h) determining if only one proposal remains for consideration; i) repeating a)-h) if more than one proposal remains; and j) identifying the one remaining proposal for consideration as the winner of the tournament.

20 Claims, 6 Drawing Sheets

100

ENABLING COMMUNITY TOURNAMENTS

CLAIM FOR PRIORITY

The present application is a Divisional Application of commonly assigned and copending U.S. patent application Ser. No. 12/604,067, filed on Oct. 22, 2011, entitled "ENABLING COMMUNITY TOURNAMENTS," which is related to and claims priority to U.S. Provisional Patent Application No. 61/193,041, filed Oct. 23, 2008, entitled "SYSTEMS AND METHODS FOR ENABLING COMMUNITY TOURNAMENTS." The disclosures of which are expressly incorporated herein by reference in their entireties.

BACKGROUND

1. Field of the Invention

The disclosure is related to networked systems comprising a plurality of apparatuses, methods executed by one or more of the plurality of apparatuses and computer-readable media storing instructions, executed by a processor, to perform the methods. More specifically, the disclosure is related to networked systems enabling community tournaments.

2. Description of Related Art

In conventional systems that provide a plurality of proposals for consideration, for example, in response to requests for proposals, individuals must consider all of the proposals at one time. This may cause an individual to become overwhelmed with the amount of information to consider.

In addition, the proposals are usually provided with the names of the person or company that submitted the proposal. This may create a bias for a person that is selecting one of the proposals depending on whether the person likes or dislikes the submitter of the proposal.

Still further, the proposals may not be properly considered by all members of a community. Thus, the selected proposal may not represent the opinion of the majority of the members of the community.

SUMMARY OF THE INVENTION

Methods, apparatus, and computer-readable media are described in the present disclosure for enabling community tournaments, including accessing a plurality of proposals for consideration; and generating and enabling a tournament, the tournament having at least one tier, the at least one tier having at least one match. Generating and enabling the tournament includes a) selecting at least one pair of proposals from the accessed plurality of proposals for consideration, each selected pair of proposals being assigned to at most one match per tier; b) scheduling the at least one match; c) accessing a plurality of registered voters; d) assigning the plurality of registered voters to one match per tier; e) receiving information from the assigned registered voters; f) determining a winner and a loser of each match based on information provided by the registered voters of the respective matches; g) removing the loser of each match from consideration in generating matches in subsequent tiers of the tournament; h) determining if only one proposal remains for consideration; i) repeating a)-h) if more than one proposal for consideration remains; and j) identifying the one remaining proposal for consideration as the winner of the tournament.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The accompanying drawings, which are incorporated in and constitute a part of this specification, illustrate embodiments of the invention and, together with the description, explain the principles of the invention. In the drawings.

DETAILED DESCRIPTION

Figure 1:
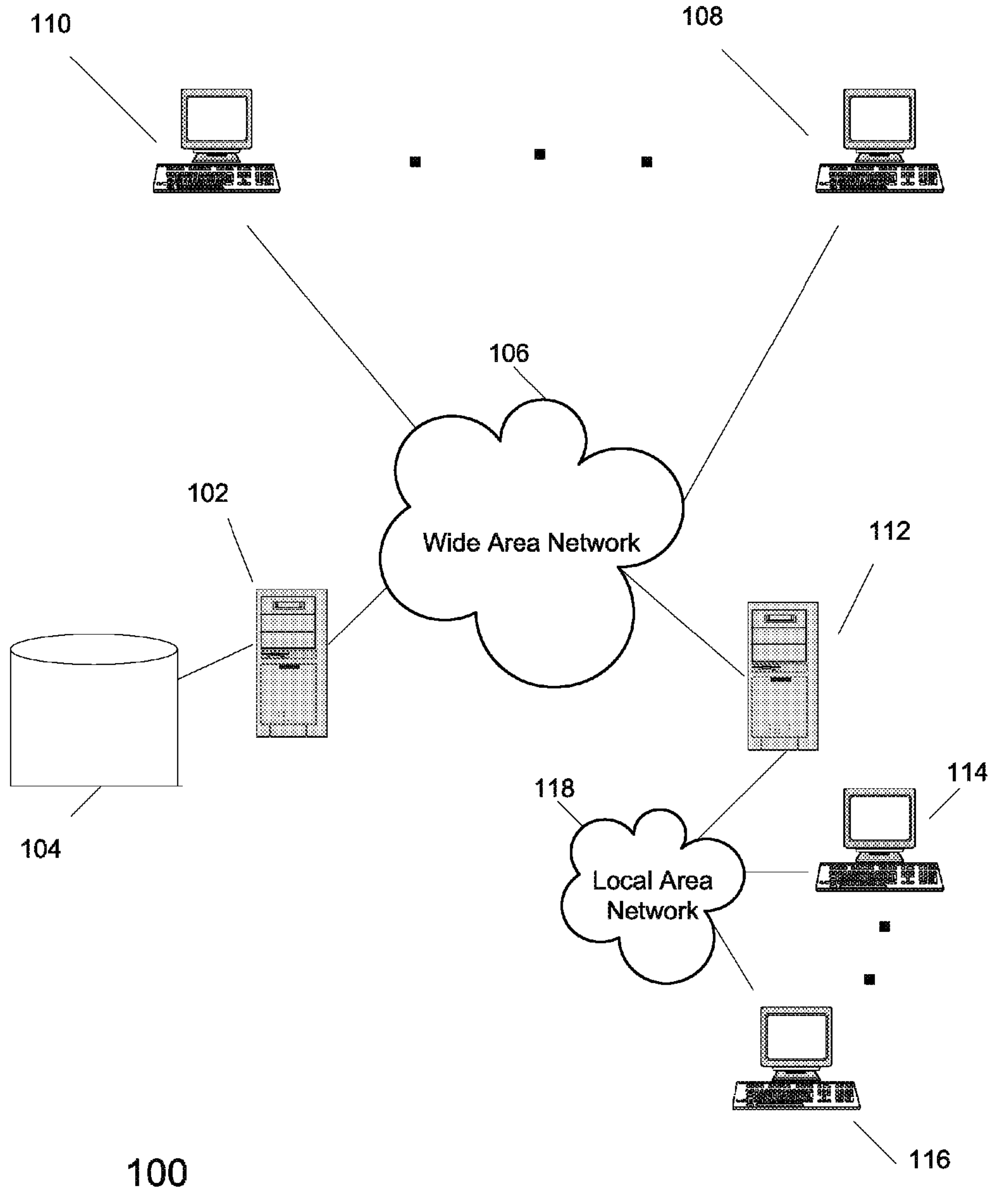
FIG. 1 is an exemplary system environment for implementing the features consistent with some embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Systems and methods and computer readable mediums consistent with principles of at least some embodiments of the present disclosure provide for generating and enable community tournaments.

Figure 2:
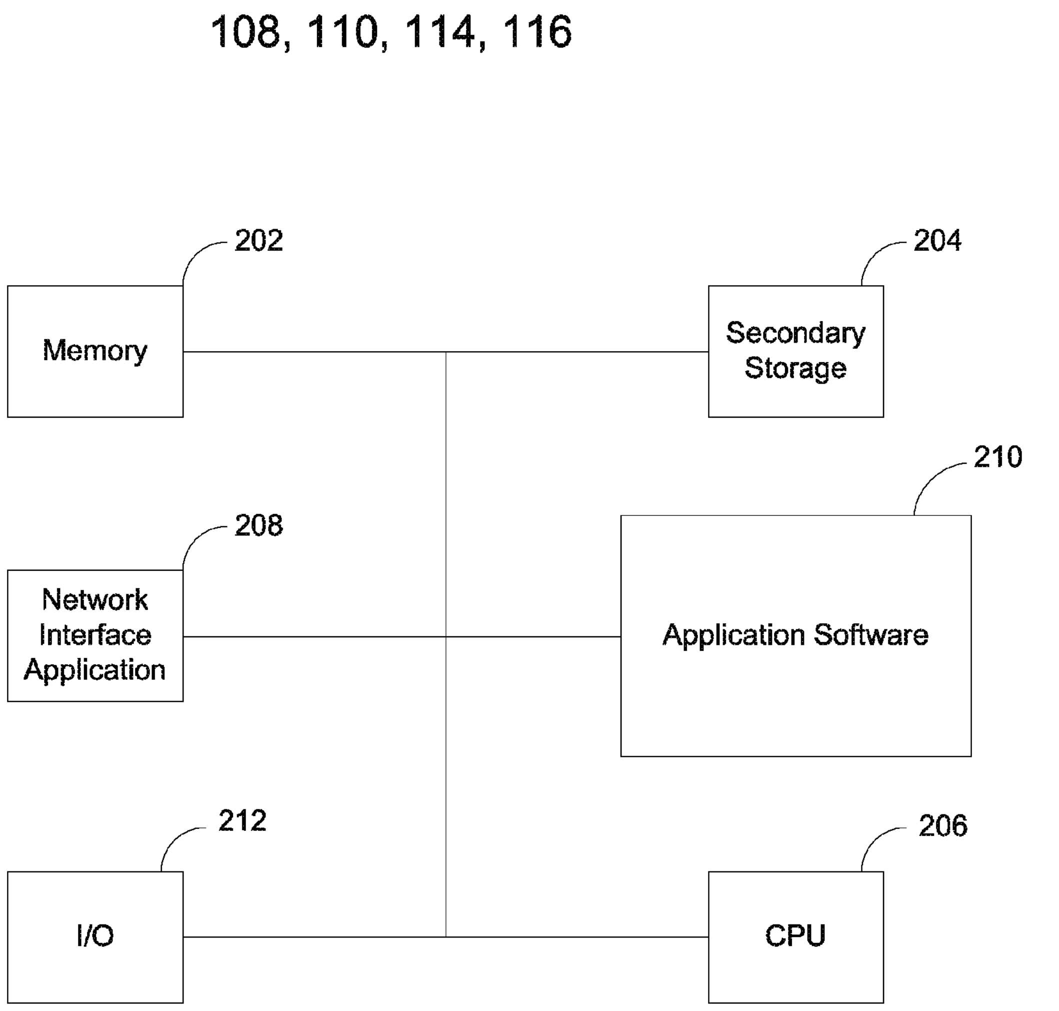
FIG. 2 is an exemplary block diagram of the components of a client computing device, consistent with principles of some embodiments of the present disclosure.
Figure 3:
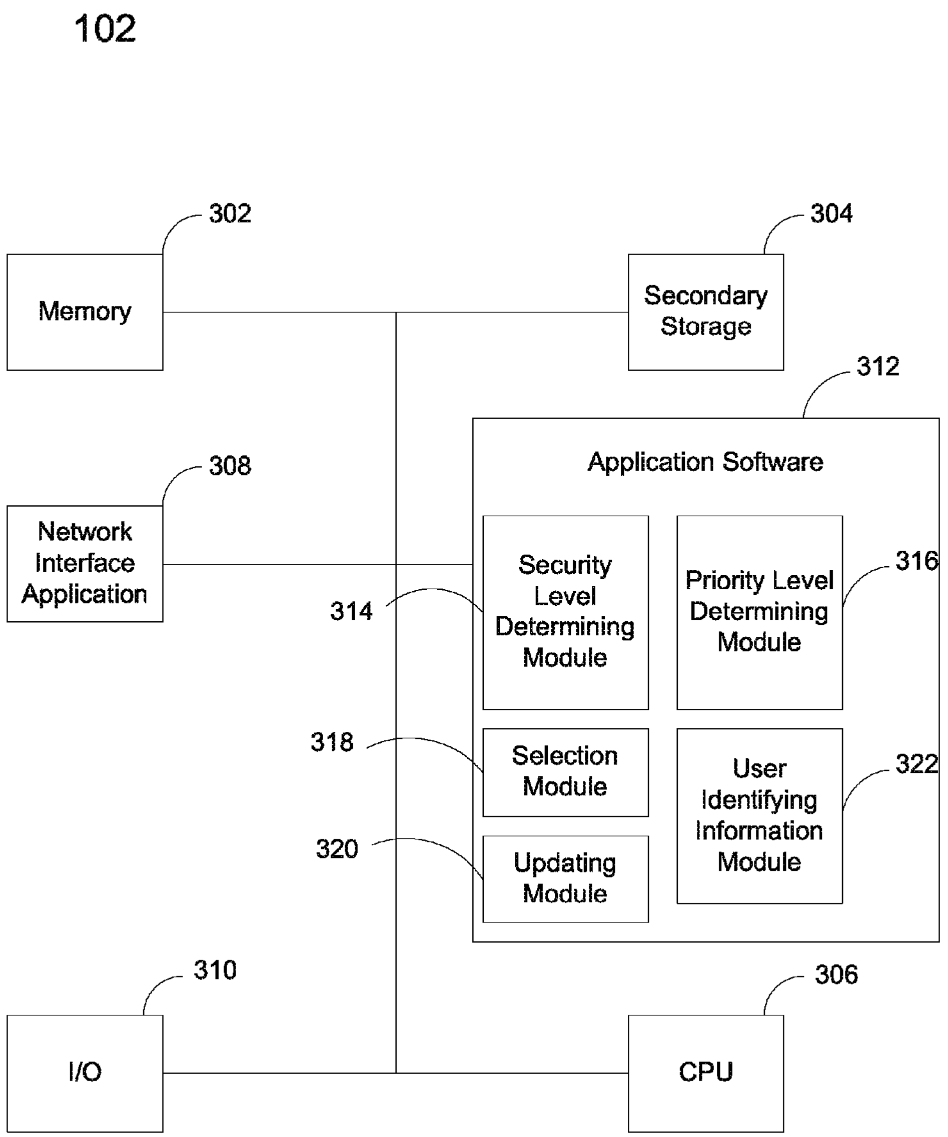
FIG. 3 is an exemplary block diagram of a server computing device 102, consistent with principles of some embodiments of the present disclosure.
Figure 4:
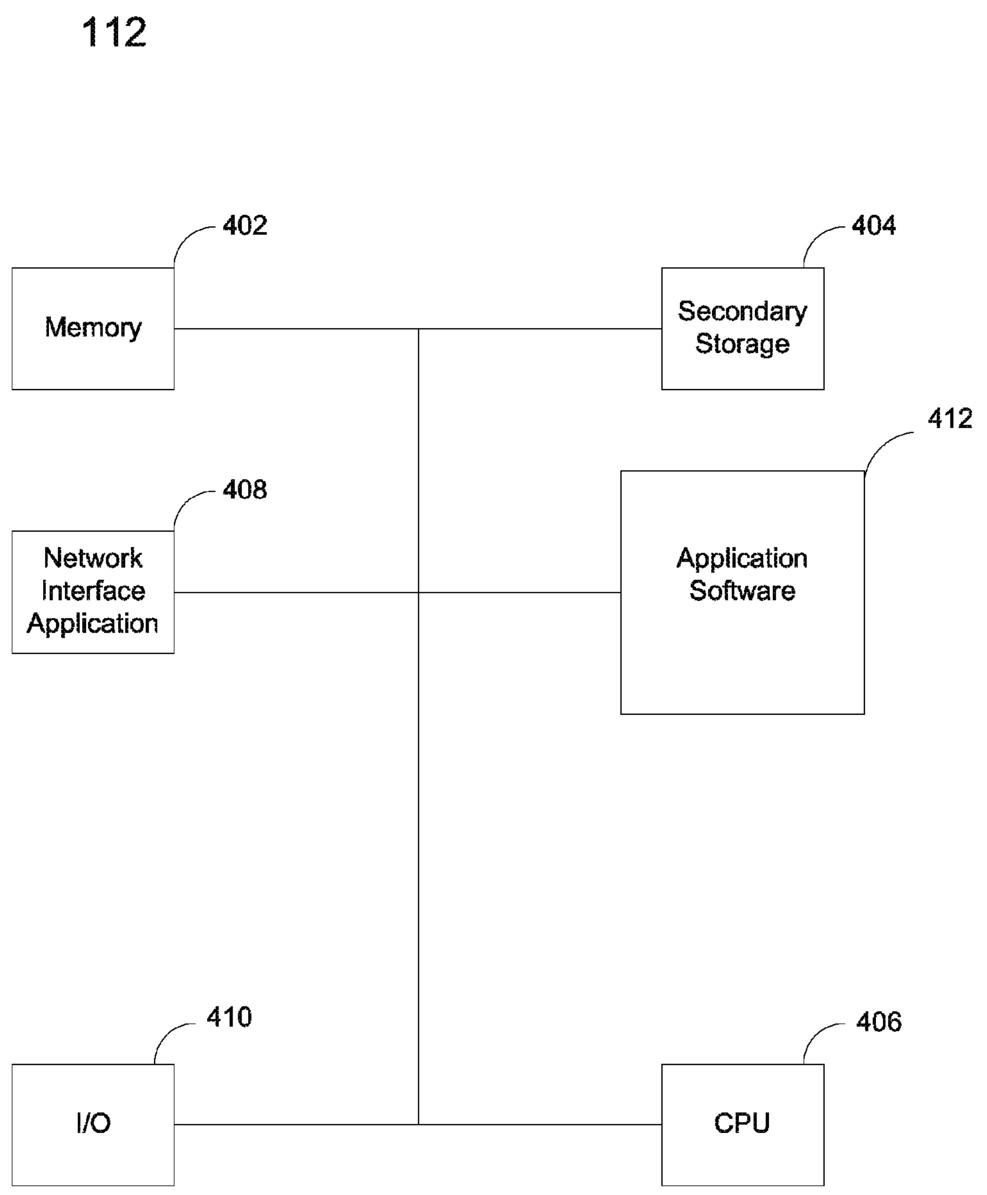
FIG. 4 is an exemplary block diagram of a server computing device 112, consistent with principles of some embodiments of the present disclosure.
Figure 5:
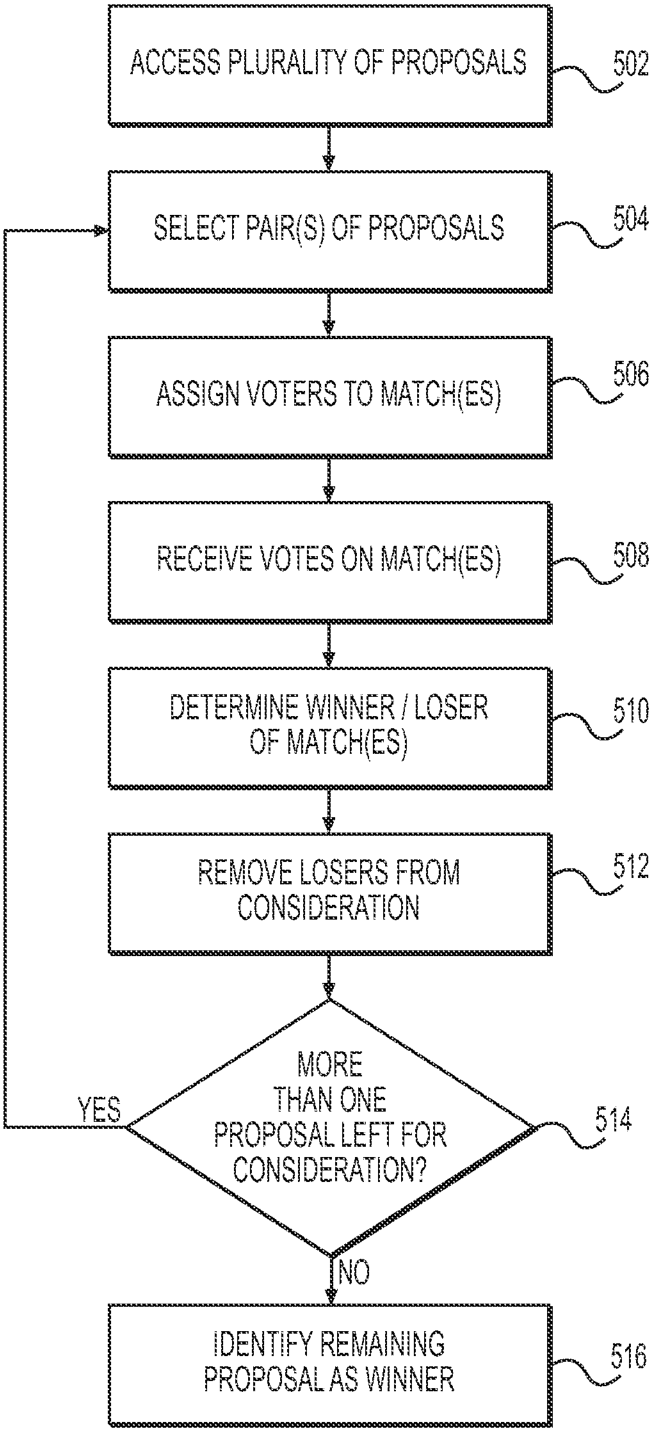
FIG. 5 is an exemplary flow diagram of the steps performed in generating and enabling a tournament, consistent with the principles of some embodiments of the present disclosure.
Figure 6:
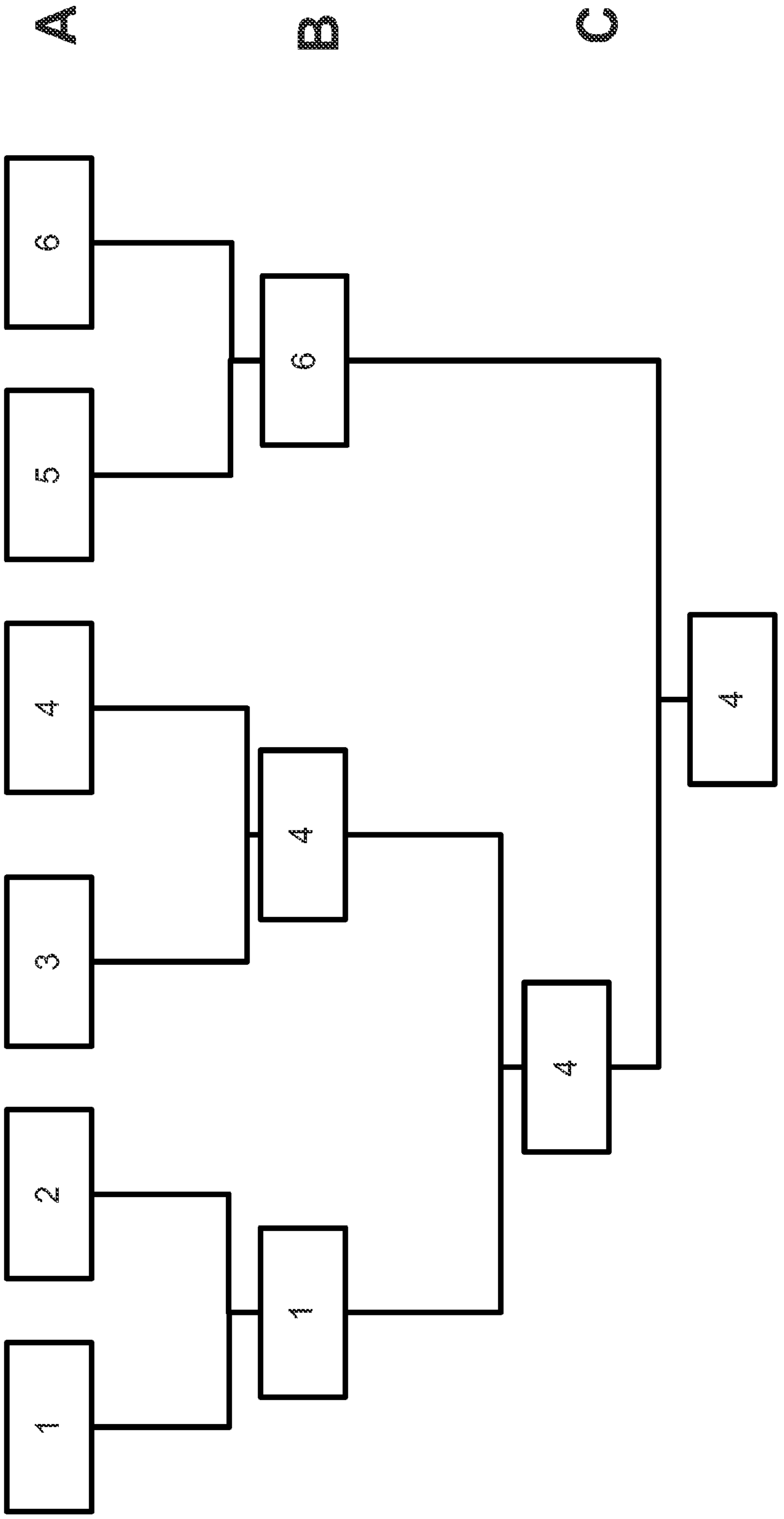
FIG. 6 is an exemplary diagram of the results of a tournament, consistent with principles of some embodiments of the present disclosure.

The accompanying drawings, which are incorporated in and constitute part of this specification, illustrate embodiments of the invention and, together with the description, explain the principles of the present disclosure. In the drawings, FIG. 1 is an example system environment for implementing the features of the present disclosure. FIG. 2 is an exemplary diagram of at least some of the components of computing devices, consistent with principles of the present disclosure. FIG. 3 is an exemplary diagram of at least some of the components of server 102. FIG. 4 is an exemplary diagram of at least some of the components of server 112. FIG. 5 is an exemplary flow diagram of the steps performed in generating and enabling a tournament, consistent with the principles of some embodiments of the present disclosure. FIG. 6 is an exemplary diagram of the results of a tournament, consistent with principles of some embodiments of the present disclosure.

Systems, apparatus, methods and computer readable mediums discussed herein relate generally to generating and enabling tournaments to be held and running tournaments within communities. A member of a community may submit a request for a tournament. The request for a tournament may identify a need or a problem that needs to be solved. The request for a tournament may be in the form of a request for a proposal. Members of the community may submit proposals for entry in the tournament. After all the proposals are submitted, a tournament may be held wherein members of the community may vote for their favorite, preferred, etc., proposal. Members may also post comments regarding the benefits or deficiencies of one or more of the proposals. These comments may be stored but not displayed until the conclusion of a tournament. At the end of the tournament, a winner is determined. All of the proposals are stored within the system before, during and after the tournament for reference.

It may be appreciated herein that a member as discussed herein may be an individual, a group, an organization and/or any other entity.

System Architecture

FIG. 1 is an exemplary diagram of system environment 100 for implementing principles consistent with some embodiments of the present invention. The components of system 100 may be implemented through any suitable combination of hardware, software and/or firmware.

Computing devices as discussed herein may include one or more processors and system memory. A memory bus can be used for communicating between the processor and the system memory.

The one or more processors may be any type of processor including, but not limited to, a microprocessor, a microcontroller, a digital signal processor, or any combination thereof. The processor core can include an arithmetic logic unit (ALU), a floating point unit (FPU), a digital signal processing core (DSP Core), or any combination thereof. A memory controller can also be used with the processor, or in some implementations the memory controller can be an internal part of the processor.

The system memory can be any type of memory including, but not limited to, volatile memory (e.g., RAM), non-volatile memory (e.g., ROM, flash memory, etc.) or any combination thereof. System memory may include an operating system, one or more applications, and data.

Computing devices as discussed herein can have computer storage media and can include volatile and nonvolatile, removable and non-removable media implemented in any method or technology for storage of information, such as computer readable instructions, data structures, program modules, or other data. System memory, removable storage and non-removable storage are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device. Any such computer storage media can be part of the computing devices as discussed herein.

Computing devices can also include an interface bus for facilitating communication from various interface devices (e.g., output interfaces, peripheral interfaces, and communication interfaces) to the computing device via a bus/interface controller. Example output devices include a graphics processing unit and an audio processing unit, which can be configured to communicate to various external devices such as a display or speakers via one or more A/V ports. Example peripheral interfaces include a serial interface controller or a parallel interface controller, which can be configured to communicate with external devices such as input devices (e.g., keyboard, mouse, pen, voice input device, touch input device, etc.) or other peripheral devices (e.g., printer, scanner, etc.) via one or more I/O ports. An example communication device includes a network controller, which can be arranged to facilitate communications with one or more other computing devices over a network communication via one or more communication ports.

As shown in FIG. 1, system 100 includes server 102 communicably linked to database 104. Computing devices 108 and 110 are communicably linked to server 102 through network 106. Computing devices 114 and 116 are communicably linked to server 102 through server 112. Computing devices 108, 110, 114 and 116 may be implemented as a portion of a portable electronic device such as a cell phone, a personal data assistant (PDA), a personal media player device, a wireless networking device, a personal headset device, an application specific device, or a hybrid device that include any of the above functions. Computing devices can also be implemented as a personal computer including both laptop computer and non-laptop computer configurations or any other suitable computing device that enables a user to communicate information through network 106 with server 102. Network 106 may be implemented as the Internet or any other wide area or local area network. Computing devices 108, 110, 112, and 114 may access server 102, which is communicably linked to an information database 104 through network 106.

Information database 104 may store information including information relating to a plurality of communities, and members of the respective plurality of communities. Information database 104 may further store information relating tournaments, (upcoming, presently running and past) etc. The information stored may include the members who submitted proposals, the proposals submitted, requests for proposals, the comments received by other community members regarding the proposals, the tournament(s) and matches the proposals participated in, the results of the tournaments and matches, etc. Database 104 may be communicably linked to wide area network 106 through web server 102.

While only two computing devices 108 and 110 are depicted, it may be appreciated that more than two computing devices may be communicably linked to network 106. While only one local area network is depicted, additional networks (wide, local, etc.) may be communicably linked to server 102 and database 104.

The system may be described in the general context of computer-executable instructions, such as program modules, being executed by a computing device. Generally, program modules include routines, programs, objects, components, data structures, etc., that perform particular tasks or implement particular abstract data types. Moreover, those skilled in the art will appreciate that embodiments of the invention may be practiced with a variety of computer-system configurations, including hand-held devices, multiprocessor systems, microprocessor-based or programmable-consumer electronics, minicomputers, etc. Embodiments of the present disclosure may also be practiced in distributed-computing environments where tasks are performed by remote-processing devices that are linked through a communications network. In a distributed-computing environment, program modules may be located in one or both local and remote computer-storage media including memory storage devices.

FIG. 2 depicts an exemplary block diagram of components included in devices 108, 110, 114, and 116 within system 100. As depicted in FIG. 2, computing devices may include memory 202, secondary memory 204, central processing unit 206, network application(s) 208, software applications 210 and input/output devices 212. It may be appreciated that the specifications of these components, and the network and software applications may vary based on the network(s) the individual devices communicate in as discussed herein and based on the software applications the devices operate as discussed herein. Network application(s) 208 may enable computing devices 108, 110, 114 and 116 to communicate with other devices within system 100. Software applications 210 may enable computing devices 108, 110, 114 and 116 to access information associated with tournaments hosted by server 102 as discussed more fully herein and further to communicate with server 102 in order to access, search and enter data into database 104. A user may enter commands and information into the computing devices 108, 110, 114, 116 through input devices 212 such as a keyboard; pointing device, commonly referred to as a mouse, trackball or touch pad; a wireless-input-reception component; a wireless source such as a remote control, etc. Other input devices may include a microphone, joystick, game pad, satellite dish, scanner, etc.

FIG. 3 depicts an exemplary block diagram of components included in server 102 within system 100. As depicted in FIG. 3, server 102 may include memory 302, secondary memory 304, central processing unit 306, network application(s) 308, application software 312 and input/output devices 310. Network application(s) 308 may enable communication between server 102 and computing devices 108, 110, 112 and 114. Application software 312 may include tournament software 316 configured to enabling scheduling, managing and executing (or enabling) tournaments as described herein. Further, application software 312 may include database management application 314 configured to interface and manage database 104.

It may be appreciated that server 102 may host a web site that may be accessed by computing devices 108, 110, 114 and 116. Information may be accessed, submitted, and/or retrieved as discussed herein through a graphical user interface provided at the web site.

FIG. 4 depicts an exemplary block diagram of components included in computing device 112. As depicted in FIG. 4, computing device 112 may include memory 402, secondary memory 404, central processing unit 406, network application(s) 408, application software 412 and input/output devices 410. Network application(s) 308 may enable communication between computing device 112 and computing devices 102, 108, 110, 112 and 114. Computing device 112 may facilitate communication between computing devices 114, 116 and other devices within system 100.

Database

Database 104 stores information that may be accessed to generate a tournament and enable tournament flow.

Database 104 may store information for establishing a plurality of communities and the members of the communities. For example, database 104 may store one or more pieces of information associated with each community, including community name, membership requirements, profile information regarding potential members of the community (e.g., is the member an individual, group, organization, other entity, etc.), start date of the community, end date of the community, history of the community, purpose of the community, administrative information regarding the community, names and associated information regarding individuals managing the community, etc.

It may be appreciated that there may be sub-communities or subsets within a community. Further, the communities may be mutually exclusive or not. Examples of subsets within a community may include a geographic location, human resources for performing conventional human resource functions, finance, etc. Tasks performed by subsets of the communities may include planning, internal and/or external communication, etc. Examples of sub communities may include a county within a state. Information regarding these subsets of communities and/or sub communities may further be stored at database 104.

A community may be a private community, wherein an application must be submitted and approved before being permitted membership into the community, an individual, group, organization, other entity, etc., must be invited by a member of the community before they are permitted membership, etc. Alternatively, a community may be a public community, wherein anyone may join the community.

Database 104 may further store information regarding members. The information may include community identifying information indentifying one or more communities that the member belongs to. Additional information regarding the members may further be stored. For example, one or more of the following may be stored and associated with members: name, home address, e-mail address, telephone number, date of birth, interests, employer, employer address, occupation, title, education, etc. One or more pieces of this information may be required in order to become a member in a particular community, based on membership requirements of the community.

Members may further be assigned an identity that may include identifying information to assist in identifying members. This information may include a common text identifier, genetic prints (e.g., finger print(s), voice print(s), dental records, etc. The level or amount of identifying information required may be dependent on membership requirements of a community that the individual, group, organization, other entity, etc., is seeking membership to.

It may be appreciated that where a member is a group, organization, other entity, etc., additional information may be stored, e.g., group, organization entity, etc., name, address, state of incorporation, information regarding individual(s) authorized to act and/or vote on behalf of the group, organization, entity, etc., including name, address, title, etc., field of operation, etc.

As discussed herein, a member is an individual, group, organization, other entity, etc., that belongs to at least one community.

Database 104 may further store information regarding requests for proposals. Each request for proposal may have associated therewith information regarding the details of the request for proposal, a time period during which proposals for consideration may be accepted, when (date, time, etc.) a corresponding tournament will start, whether comments may be submitted, a time period for accepting comments, whether submitted comments will be made available and to who the comments may be made available, who is eligible for submitting a proposal for consideration, which communit(ies) are eligible to submit proposals for consideration, which communit(ies) are eligible to vote for the submitted proposals, identifying information regarding who submitted the request for proposal, etc.

Database 104 may further store proposals. Proposals may be submitted by members and may be associated with identifying information identifying the member that submitted the proposal. The proposals may further be stored with information identifying a corresponding request for proposal that indicates the request for proposal that the proposal is being submitted in response to. The proposals may further be stored with a respective associated status indicator indicating whether the proposal is to be entered into a tournament, whether the proposal has already been in a tournament and including the details of the tournament and the result of any matches and tournaments that the proposal has participated in, etc.

It may be appreciated that, alternatively, proposals may or may not be submitted by a member of the community.

It may be appreciated that database 104 may further store information regarding individuals, groups, organizations, other entities, etc., that do not belong to any community.

It may be appreciated by one skilled in the art that all of the information stored in database 104 may be accessed by, for example, generating queries and searching for one or more members, proposals, etc.

It may be appreciated by one skilled in the art that members may access, add, retrieve, store, etc., information within the database by using a graphical user interface as is appreciated by one skilled in the art.

It may be appreciated by one skilled in the art that the functionality as disclosed herein may be executed in a virtual environment, wherein a community environment is simulated consistent with characteristics typical of the community as defined in database 104. In this embodiment, members of the community may be represented as avatars movable within the virtual environment by the respective members and may participate in the tournaments as discussed herein.

Generation and Enabling of Tournament

It may be appreciated that each tournament may follow a cycle. The cycle may include, for example, a submission period, a selection period, a probation period, and a storage/clearance period.

FIG. 5 depicts an example flow diagram of the steps performed in generating and enabling a tournament consistent with some embodiments of the present disclosure. The steps depicted in FIG. 5 may be performed to identify one "better" or "winning" proposal out of a plurality of proposals that are submitted in response to a request for proposal.

1. Submission

Proposals for consideration may be provided at any time by a member in response to a request for proposal, etc. The request for proposal may identify a particular issue or problem that needs to be solved. The request for proposal may further set forth a time period in which proposals for consideration may be accepted.

Members may submit proposals using their identity or proposals may be submitted anonymously. If the proposal is submitted anonymously, then the member that submitted the proposal may forfeit all rights to the proposal, e.g., legal rights, financial benefits, etc.

A random number may be assigned to each proposal as it is received, may be assigned when the matches are scheduled, or at any time in between.

The identity of the member that submitted the proposal may not be identified as the proposal moves through the tournament.

It may be appreciated that before the matches begin, there may be a proposal consideration or discussion period wherein the proposals are available for viewing and consideration by members of the community. In addition, comments may be submitted by members of the community, including opinions regarding one or more proposals. These comments may or may not be made available to other members of the community until after a winner of the tournament is determined. These comments may be archived and stored after the tournament has concluded and may be viewable to members of the community.

It may be appreciated that, alternatively, the comments may be made available to other members of the community before the matches begin and before the end of the time period for accepting proposals for consideration. Thus, comments from members of the community may be considered and prompt a member to make a submission of a proposal for consideration addressing the members' comments of another proposal.

2. Selection

Notification of the details of the tournament may be provided to the community and its members. The details of the tournament may include the request for proposal, the start time/date of the tournament and its matches, etc. This notification may be sent electronically, e.g., by e-mail, SMS, posted on an electronic billboard, etc. The notification may be sent to, e.g., all members in one or more communities to which the issue or problem relates. The members that are selected to receive this notification may be selected based on one or more pieces of information that are stored and associated with the members in the database. For example, the members may be selected based on a geographic location, e.g., a zip code where the request for proposal relates to a road widening project in that zip code, or any other piece of information that is associated with the member.

In order to participate in the selection process, members may use their identity to register for a ballot. It may be appreciated that this registration process may be accomplished, e.g., a member may be registered as a voter, when the member transmits a request for a ballot, server 102 receives a response to the notification of the tournament from the member indicating a desire to receive a ballot, etc.

It may be appreciated that the member that receives this notification may further be provided with a time period in which the member may register or opt out of participating in the tournament. If the member opts out of participation in the tournament, then the member will not be assigned to any matches in the tournament. If the member successfully registers for the tournament, then the member may submit a vote for each match the member is assigned to in the tournament.

The tournament may include at least one match and at least one tier depending on the number of proposals that are eligible consideration. A match may be held between two proposals. It may be appreciated that the identity of the member that submitted the proposal for consideration may not be revealed prior to or during the execution of the tournament. This may prevent bias toward or against a proposal for consideration. Once the match is concluded, a winner and a loser are identified. The winning proposal of each match may proceed to the next tier and may still be a proposal for consideration. However, a losing proposal of each match may no longer be considered a proposal for consideration in that tournament. It may be appreciated that a match may be held between more than two proposals.

It may be appreciated that generating and enabling of the tournament may be performed automatically when a certain condition has been satisfied, e.g., if a deadline has been set for receiving proposals based on a request for proposal, once the deadline has passed, the tournament may be automatically generated and enabled as discussed herein; if the request for proposal has set a maximum number of proposals for consideration, once the maximum number of proposals have been received, the tournament may be automatically generated and enabled as discussed herein; etc. Alternatively, the tournament may be generated and enabled as discussed herein based on an input received by a user.

Tournament application 316 may be utilized in performing the steps as discussed with regard to FIG. 5. As shown in FIG. 5, server 102 accesses a plurality of proposals for consideration (Step 502). One or more of the plurality of proposals may be stored at server 102, database 104, at other devices within environment 100, etc. One or more proposals may be accessed based on information associated with the proposal. For example, proposals for consideration that are associated with a specific request for proposal may be accessed for a tournament.

Once all of the proposals for consideration are accessed, pairs of proposals are selected (step 504). The pairs of the proposals may be selected randomly, e.g., based on the random numbers assigned to each of the proposals. If the number of proposals for consideration is an even number, all of the proposals for consideration may be paired and assigned to match for that tier. If the number of proposals is an odd number, one proposal for consideration may be randomly selected to have a "bye" wherein all of the other proposals are paired and assigned to a match.

A plurality of members is selected as voters for participating in the tournament (step 506). The voters may be registered in the database and may have registered to receive a ballot in order to cast a vote.

The plurality of registered voters is divided into a number of groups, where the number of groups depends on the number of matches that may be held for that particular tier. The voters may be divided into groups randomly. The voters may receive notification regarding which match they are assigned to. This notification may be sent electronically, e.g., by e-mail, SMS, posted on an electronic billboard, etc. The notification may further include one or more of the following: details of the tournament, information identifying the proposals that are in the tournament, details of the match the voter is assigned to, details of the two proposals in the match, the details of each of the proposals, identifying information regarding where in environment 100 the proposals are stored, the time period for submitting comments for one or more of the proposals, the time period for submitting a vote for the match, etc.

The voters may then submit information regarding a vote for one proposal for their assigned matches (step 508). This information may be received and stored, for example, within a particular time frame that is assigned to each of the matches.

Once each of the matches is completed, e.g., the time period in which the match was to take place has expired, the winner proposal and the loser proposal are determined based on the information received from the voters assigned to the match (step 510).

The loser proposal of each match is removed as a proposal for consideration in the tournament (step 512).

After all of the matches for the tier have been completed, the winning proposals of each match, and any remaining proposal that received a bye for the tier are determined (step 514). If there is more than one remaining proposal for consideration (step 514, Yes), then processing proceeds to step 504 wherein another tier of matches is generated and the matches conducted as set forth in steps 504-512. If there is only one remaining proposal for consideration left (step 514, No), then the remaining proposal is identified as the winner of the tournament (step 516).

The winning proposal of the tournament may be identified in a notification to the voters in the tournament. This notification may be sent electronically, e.g., by e-mail, SMS, posted on an electronic billboard, etc. The notification may further include one or more of the following: details of the match, e.g., the score of the match identifying the number of votes received for each proposal, the details of each of the proposals, identifying information regarding where in environment 100 the proposals are stored, the identity of the member that submitted the winning proposal, etc.

3. Probation

It may be appreciated that the details of the tournament, after completion, may be stored and accessed by members, e.g., members of the related community, e.g., indefinitely or for a period of time. The details of the tournament may include one or more of the following: the list of matches, the list of matches per tier, the score of each match, the identity of the members that submitted each of the proposals in the tournament, comments that were received for any of the proposals prior to the start of the matches, etc. Further, the proposals may be ranked based on the results of the matches in the tournament, e.g., from best to worst. The ranking of each of the proposals may further be stored and accessed. Still further, the time required for access of each proposal may be stored. The time required for access may be assigned based on the ranking of each of the proposals. For example, the proposal with the lowest, or worst, rank, may either not be stored or the length of time to find it is longer than the highest ranked proposal which will be stored and found first in a search.

During the probation period, members who submitted proposals that participated in the tournament may decide to reveal their identity to the members of the community. If the member who submitted the winning proposal does not reveal their identity, they may relinquish their claim to the proposal, which may be put out for tender, e.g., if it is a concept that requires development.

The tender process may be in the form of a second tournament. The winner of the tender may be awarded the responsibility to deliver the product or service defined in the proposal. For example, if a city X wins the right to host the Olympic Games in 12 years, the city has to build those facilities it said it would as set forth in the proposal in order to be able to host it. Those proposals go out to tender and companies bid on them. The difference this time is the bids reviewed are stripped of their identity.

4. Storage/Clearance

At the end of the probation period, proposals that are declared to be the winner may be stored in an archive that places this information in the most rapidly accessible areas of the information repository of the community. All other proposals may be stored according in an intermediate or slower/slowest speed of access storage areas of the repository. Alternatively, the losing proposals may be deleted, according to rank. For example the winning proposal will be stored in the most easily accessible areas, the next N number of proposals (N being an integer >1) in intermediate and all others e.g., deleted to save space. It may be appreciated that the storage and clearance processes may or may not be performed concurrently.

Tournament Flow

FIG. 6 depicts an example diagram of tournament consistent with some embodiments of the present disclosure. As shown in FIG. 6, a tournament is being held to determine who has the best proposal. Six members of a community have submitted proposals for consideration by the community's members. These submissions may have been made upon receipt and consideration of a Request for Proposals. Each of the proposals may be assigned random numbers (i.e., 1-6) and the identity of the member who submitted the proposals may not be known while the tournament is being run. The members' identity may be associated with the respective proposal after a winner of the tournament has been determined.

At the outset, all of the members of the community may be notified of the tournament. This notice may be in the form of e-mail notification, instant messaging, posting on an electronic bulletin board, etc. A schedule of matches may be posted. If a member of the community wishes to participate as a voter in the tournament, the member may be required to register for a ballot. The registered voters may be randomly divided and randomly assigned to one match per tier (i.e., tiers A, B, C in FIG. 6). A reviewing period of time is provided for the members to review the proposals. During the reviewing period, the registered voters that are assigned to a particular match may vote for one of the proposals for consideration in the registered voters' assigned match. The proposal for consideration that receives the most votes, per match, proceeds to the next tier. As shown in FIG. 6, proposals 1, 4 and 6 received the most votes per match in tier A and proceed to tier B.

If there is more than one match, the registered voters would be again, divided and randomly assigned to one match per tier. However, in tier B, only one match is occurring. Therefore, all of the registered voters may be assigned to the one match. Proposal 6 receives a "bye" and is not participating in a match in tier B. A reviewing period of time may be provided for the voters to review the proposals. During the reviewing period, the registered voters that are assigned to a particular match may vote for one of the proposals in the registered members' assigned match. The proposal that receives the most votes proceeds to the next tier. As shown in FIG. 6, proposal 4 received the most votes and proceeds to tier C.

As only one match is occurring in tier C, all of the registered voters are assigned to the final match. A reviewing period of time may be provided for the voters to review the proposals. The proposal that receives the most votes, per match, wins the match. As shown in FIG. 6, proposal 4 received the most votes and is the only proposal remaining in the tournament. Thus, in the example shown in FIG. 6, proposal 4 is the winner of the tournament.

After the tournament, all of the results, including any comments submitted by the voters may be stored during a probation period as noted above and may be archived and available for future reference.

The Frequency of Tournaments

A purpose of creating a community is to allow collaborative adaptation to new or different conditions. Any member of the community may initiate a tournament. However, if it is outside a regular schedule, e.g., if only one tournament is held per month and a member wishes to have an additional tournament in the month, in one embodiment, the member may have a tournament outside the regular tournament schedule based on the importance or short deadline for the issue or problem. In other words, a decision must be made quickly or the idea may fail. Thus, one or more communities may have a member designated to be in charge in an emergency, e.g., able to make decision without consultation because there is insufficient time. This member's name and contact information may be stored in database 104. This member may be the most experienced, and may have volunteered or been selected by their community to do so. Further, the member may be held accountable after the fact for any emergency decisions the member makes.

The frequency by which a Tournament should be held is based on the need of a community to adapt. New Orleans and Katrina are a good example. That community expanded beyond New Orleans to include the federal government and many other agencies. They were immobilized by not knowing what to do and/or knowing what to do but unsure of how to coordinate.

In this situation a community may be created, and all the identified tasks that must be done, entered into a set of tournaments. Agencies, companies, etc., may submit proposals to address the tasks. A set of tournaments may be generated and enabled as discussed herein and, based on the winners of the tournaments, the tasks may be assigned to those who successfully proposed the better or winning ideas. This way, the agencies and companies are immediately given the authority to undertake their winning proposal and all of the members of the community know what the other is doing because it is posted for all of the members to view.

Tournaments may be part of an iterative process, for example, if the initial proposals are expected to require revision, they will go through a series of tournaments before a final declaration of the better one. This allows this system to be used for the development of e.g. standards.

Examples of General Application Principles

It may be appreciated that the systems and methods disclosed herein may identify a concept that may be considered "the current standard" that defines the actions of the "collaborative consortiums" or "communities" that utilize it.

For example: the wearing of seatbelts to reduce the risk of injury in a motor vehicle accident would be considered a standard. In some communities wearing seatbelts may be law.

Standards and Laws may not necessarily the same thing, i.e. a standard may exist that is not enforced by laws. However incidents where a person, company, etc. "fell below standard" is often a component of judgments related to legal proceedings.

The following is an example of how a Tournament of Ideas could be used to establish a standard that has benefit for the "greater good".

Company X develops seatbelts and patents it. It is discovered that seatbelts save lives and it become a national safety standard to have seatbelts in all cars. Company X patents the innovation and wants to be the sole licensed provider of seatbelts.

The company, however, does not have the capacity to provide seatbelts at a rate fast enough for all car builders to meet the new standard for their next car model. This will cause all of them to fall below standard. In this situation, the concept of the "greater good" must take precedence over of the individual company's desire to be a monopoly.

The car companies form a "Collaborative Consortium" (or community), and use the one or more tournaments to identify the better proposal to remedy this matter. They invite Company X to contribute proposals towards a resolution of the dilemma. The identities of those who submit proposals are stripped off, and the tournament begins and proceeds as set forth above.

An anonymous proposal wins that states that each car company will manufacture their own seatbelts to the standard set by Company X, and each of the car companies will pay Company X a royalty of x dollars per belt for five years so to insure Company X recaptures their research investment plus $x dollars in profit. After five years no further payments may be paid.

Doing this will ensure Company X receives money to continue research and build innovative products and to ensure that standards involving safety can be rapidly implemented for the preservation of the "greater good".

This same process can be used for Pharmaceutical companies, for example, if a shortage of a drug that saves lives arises. For example, in a pandemic there maybe 100 companies capable of making a drug that can prevent or treat influenza, but only two that have the patent and/or a right to manufacture them. It is certain that two companies cannot make enough of the drug during a pandemic to protect a population. It is certain that 100 pharmaceutical companies can make much more and can prevent more people from falling ill and dying. Releasing the proprietary information to the 100 would be in the interest of the greater good.

The 98 companies can form a "collaborative consortium" type of community and invite the two with patents to participate. It is likely that the 98 will propose the patent be released in return they will pay Companies A and B a royalty so they can recover the cost of the research and marketing, etc. In addition they would award what they consider is a reasonable profit, that they would also expect should they be company A or B. Doing this will ensure the financial security of the company and the rapid deployment of a medicine needed by the population.

It may be argued that the consortium numbers could overpower Companies with a patent(s) and pay them nothing in return for the use of the proprietary information. However this would not benefit any, as the company with the patent will not release it under those circumstances.

Examples of Specific Applications

It may be appreciated that there is a wide variety of applications for the methods, apparatus, and systems as discussed herein. For example, Wikipedia. Differing descriptions may be submitted that contradict each other. These differing descriptions may be considered proposals and may be entered into a tournament. The successful or winning "description" may be entered into the Wikipedia data base. The entry would have attached to it a reference that indicates it was chosen as the better or winning description, as the result of a tournament held by X persons, against Y other descriptions on a particular date.

Another example may be a request for quote to build a brick fence at the local school; or a request for proposal to receive a research grant.

Another example may be mediation in e.g. in a union dispute. In this case anyone may be allowed to submit a proposal for resolution and all members affected by it may be permitted to vote. This changes the process from a "yes" or "no" to a single proposal to being able to view multiple proposals. The community may include the company who, for example, may feel they cannot meet union demands and stay in business. This allows them to submit a proposal as well. All proposals are stripped of their identity and the source of proposal will not be known.

Another example may be setting of standards; Selection of one candidate from many for a single position; choosing the best song from thousands; etc.

It may further be appreciated that while the discussion set forth herein refers to members of a community, alternatively, individuals, groups, organizations, other entities, etc., need not be members of a community and may participate as set forth herein without requiring membership into any particular community while being part of the general public. This may be appreciated where requests for proposals are not limited to one or more communities, but may be open to the general public.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution.

Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for enabling community tournaments, said method comprising:

accessing, by a processor, a plurality of proposals for consideration by a plurality of voters;

generating, by the processor, a tournament for selecting one of the plurality of proposals, wherein generating the tournament comprises:

scheduling a first match between a first pair of the plurality of proposals;

receiving information from the plurality of voters pertaining to the first pair of the plurality of proposals;

determining a winner and a loser of the first match based upon the information received from the plurality of voters; and removing the loser of the first match from consideration in a subsequent match.

2. The method according to claim 1, wherein generating the tournament further comprises:

scheduling a second match between a second pair of the plurality of proposals;

receiving information from the plurality of voters pertaining to the second pair of the plurality of proposals;

determining a winner and a loser of the second match based upon the information received from the plurality of voters; and removing the loser of the second match from consideration in the subsequent match.

3. The method according to claim 2, further comprising:

scheduling the subsequent match between the winner of the first match and the winner of the second match;

receiving information from the plurality of voters pertaining to the subsequent match;

determining a winner and a loser of the subsequent match based upon the information received from the plurality of voters; and removing the loser of the subsequent match.

4. The method according to claim 3, further comprising:

scheduling further matches between winners of previous matches;

receiving information from the plurality of voters pertaining to the further matches;

determining winners and losers of the further matches based upon the information received from the plurality of voters;

removing the losers of the further matches from still further matches until one winner proposal remains; and identifying the remaining winner proposal as the winner of the tournament.

5. The method according to claim 3, wherein the first match and the second match are in the same tier of the tournament and wherein the subsequent match is in a subsequent tier of the tournament.

6. The method according to claim 1, further comprising:

accessing the plurality of voters, wherein the plurality of voters comprise registered voters.

7. The method according to claim 6, further comprising:

assigning the plurality of registered voters to one match per tier of the tournament.

8. The method according to claim 6, wherein the plurality of proposals are received from respective submitters, and wherein identities of the submitters of the plurality of proposals are withheld from the plurality registered voters.

9. The method according to claim 6, wherein accessing the plurality of voters further comprises accessing the plurality of voters based on community information associated with each of the plurality of voters.

10. The method according to claim 1, wherein generating the tournament further comprises:

providing access to details of each of the plurality of proposals for consideration to the plurality of voters;

receiving information from a device of at least one of the plurality of voters regarding the proposals for consideration; and storing the information by associating the received information with the proposal for consideration.

11. An apparatus for enabling community tournaments, comprising:

a memory storing machine readable instructions to generate a tournament for selecting one of a plurality of proposals for consideration by a plurality of voters, wherein the machine readable instructions are to:

schedule a first match between a first pair of the plurality of proposals;

receive information from the plurality of voters pertaining to the first pair of the plurality of proposals;

determine a winner and a loser of the first match based upon the information received from the plurality of voters; and remove the loser of the first match from consideration in a subsequent match; and a processor to implement of the machine readable instructions.

12. The apparatus according to claim 11, wherein the machine readable instructions are further to:

schedule a second match between a second pair of the plurality of proposals;

receive information from the plurality of voters pertaining to the second pair of the plurality of proposals;

determine a winner and a loser of the second match based upon the information received from the plurality of voters; and remove the loser of the second match from consideration in the subsequent match;

schedule the subsequent match between the winner of the first match and the winner of the second match;

receive information from the plurality of voters pertaining to the subsequent match;

determine a winner and a loser of the subsequent match based upon the information received from the plurality of voters; and remove the loser of the subsequent match.

13. The apparatus according to claim 12, wherein the machine readable instructions are further to:

schedule further matches between winners of previous matches;

receive information from the plurality of voters pertaining to the further matches;

determine winners and losers of the further matches based upon the information received from the plurality of voters;

remove the losers of the further matches from still further matches until one winner proposal remains; and identify the remaining winner proposal as the winner of the tournament.

14. The apparatus according to claim 12, wherein the first match and the second match are in the same tier of the tournament and wherein the subsequent match is in a subsequent tier of the tournament.

15. The apparatus according to claim 11, wherein the machine readable instructions are further to:

access the plurality of voters, wherein the plurality of voters comprise registered voters.

16. The apparatus according to claim 15, wherein the plurality of proposals are received from respective submitters, and wherein identities of the submitters of the plurality of proposals are withheld from the plurality registered voters.

17. The apparatus according to claim 11, wherein the machine readable instructions are further to:

provide access to details of each of the plurality of proposals for consideration to the plurality of voters;

receive information from a device of at least one of the plurality of voters regarding one of the proposals for consideration; and store the information by associating the received information with the proposal for consideration.

18. A non-transitory computer-readable medium in communication with a processor, storing a set of instructions, executed by the processor, to perform a method for enabling community tournaments, the set of instructions comprising code to:

access a plurality of proposals for consideration by a plurality of voters;

generate a tournament for selecting one of the plurality of proposals by:

scheduling a first match between a first pair of the plurality of proposals;

receiving information from a plurality of voters pertaining to the first pair of the plurality of proposals;

determining a winner and a loser of the first match based upon the information received from the plurality of voters; and removing the loser of the first match from consideration in a subsequent match.

19. The non-transitory computer-readable medium of claim 18, the set of instructions further comprising code to generate the tournament by:

scheduling a second match between a second pair of the plurality of proposals;

receiving information from the plurality of voters pertaining to the second pair of the plurality of proposals;

determining a winner and a loser of the second match based upon the information received from the plurality of voters;

removing the loser of the second match from consideration in the subsequent match;

scheduling the subsequent match between the winner of the first match and the winner of the second match;

receiving information from the plurality of voters pertaining to the subsequent match;

determining a winner and a loser of the subsequent match based upon the information received from the plurality of voters; and removing the loser of the subsequent match.

20. The non-transitory computer-readable medium of claim 19, the set of instructions further comprising code to generate the tournament by:

scheduling further matches between winners of previous matches;

receiving information from the plurality of voters pertaining to the further matches;

determining winners and losers of the further matches based upon the information received from the plurality of voters;

removing the losers of the further matches from still further matches until one winner proposal remains; and identifying the remaining winner proposal as the winner of the tournament.

* * * * *